United States Patent
Murata et al.

(10) Patent No.: US 10,777,886 B2
(45) Date of Patent: Sep. 15, 2020

(54) WIRELESS POWER TRANSMISSION DEVICE, WIRELESS POWER TRANSMISSION SYSTEM, AND WIRELESS POWER TRANSMISSION METHOD

(71) Applicant: KABUSHIKI KAISHA TOSHIBA, Minato-ku (JP)

(72) Inventors: Kentaro Murata, Ota (JP); Kohei Onizuka, Shinagawa (JP); Toshiya Mitomo, Yokahama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 14 days.

(21) Appl. No.: 16/290,403

(22) Filed: Mar. 1, 2019

(65) Prior Publication Data

US 2020/0091602 A1    Mar. 19, 2020

(30) Foreign Application Priority Data

Sep. 18, 2018 (JP) ................................. 2018-173761

(51) Int. Cl.
*H02J 50/23* (2016.01)
*H02J 50/60* (2016.01)
(Continued)

(52) U.S. Cl.
CPC ......... *H01Q 3/2611* (2013.01); *H01Q 3/2623* (2013.01); *H01Q 3/28* (2013.01);
(Continued)

(58) Field of Classification Search
CPC .......... G01S 7/415; G01S 13/06; G01S 13/42; G01S 13/46; G01S 13/50; G01S 13/52;
(Continued)

(56) References Cited

U.S. PATENT DOCUMENTS 5,585,803 A * 12/1996 Miura ...................... H01Q 3/26
                                                    342/157
6,084,540 A *  7/2000 Yu ............................. G01S 3/28
                                                    342/13
(Continued)

FOREIGN PATENT DOCUMENTS

| JP | 2013-123346 | 6/2013 |
| JP | 2014-228291 | 12/2014 |
| JP | 2017-129558 | 7/2017 |

OTHER PUBLICATIONS

Bruhtesfa Godana, et. al., "Estimating human movement parameters using a software radio-based radar," International Journal on Advances in Systems and Measurements, vol. 4, No. 1&2, 2011, 12 pages.

(Continued)

*Primary Examiner* — Levi Gannon
(74) *Attorney, Agent, or Firm* — Oblon, McClelland, Maier & Neustadt, L.L.P.

(57) ABSTRACT

A wireless power transmission device includes a power transmitter to transmit a wireless power signal through a plurality of first antennas, a propagation path estimation unit to estimate first propagation path information characterizing a propagation path between the plurality of first antennas and a predetermined antenna, a propagation path extraction unit to extract second propagation path information characterizing a propagation path passing through a moving body, based on at least one of a difference on a time axis of a plurality of pieces of the first propagation path information each acquired at different times, and filtering on a frequency axis, a weight calculator to calculate a weight vector that determines a directivity of a combined power transmission beam formed by the plurality of first antennas, and a controller to control an amplitude and a phase of the wireless power signal inputted to each of the plurality of first antennas.

18 Claims, 11 Drawing Sheets

(51) Int. Cl.
*H02J 50/90* (2016.01)
*H01Q 3/28* (2006.01)
*H01Q 3/36* (2006.01)
*H01Q 3/26* (2006.01)
*H02J 50/20* (2016.01)
*H02J 50/40* (2016.01)

(52) U.S. Cl.
CPC ............... *H01Q 3/36* (2013.01); *H02J 50/20* (2016.02); *H02J 50/23* (2016.02); *H02J 50/40* (2016.02); *H02J 50/60* (2016.02); *H02J 50/90* (2016.02)

(58) Field of Classification Search
CPC .. H01Q 3/26–2652; H02J 50/20; H02J 50/23; H02J 50/27; H02J 50/40; H02J 50/402; H02J 50/60; H02J 50/90
See application file for complete search history.

(56) References Cited

U.S. PATENT DOCUMENTS

| | | | |
|---|---|---|---|
| 6,590,532 B1* | 7/2003 | Ogawa | H01Q 1/246 |
| | | | 342/372 |
| 9,941,730 B1* | 4/2018 | Kim | H02J 50/20 |
| 10,153,645 B1* | 12/2018 | Bell | H02J 5/005 |
| 2017/0149294 A1* | 5/2017 | Wight | H02J 50/90 |
| 2017/0205502 A1 | 7/2017 | Honma et al. | |
| 2017/0288475 A1* | 10/2017 | Lee | H02J 50/90 |
| 2018/0301937 A1* | 10/2018 | Park | H04N 21/47217 |
| 2019/0052114 A1* | 2/2019 | Lee | H02J 7/00034 |

OTHER PUBLICATIONS

Takashi Miwa et. al., "Localization of living-bodies using single-frequency multistatic doppler radar system," IEICE Transactions on Communications, vol. E92-B, No. 7, Jul. 2009, 9 pages.

* cited by examiner

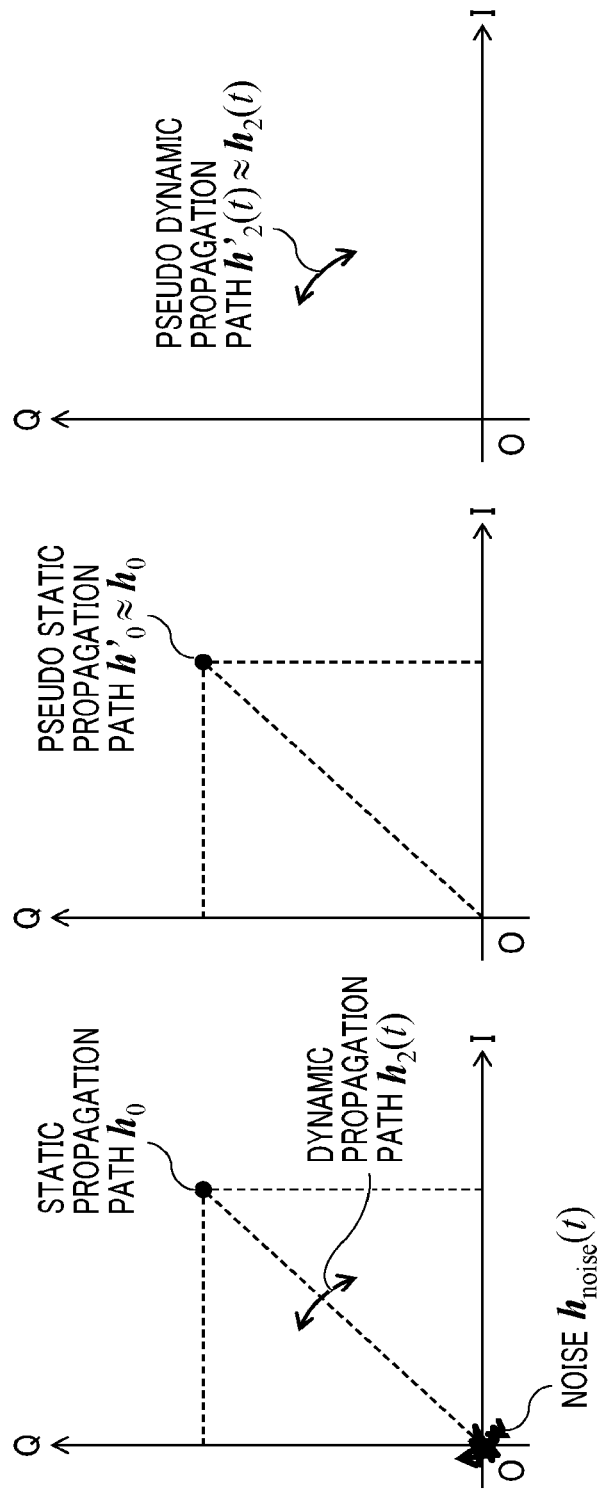

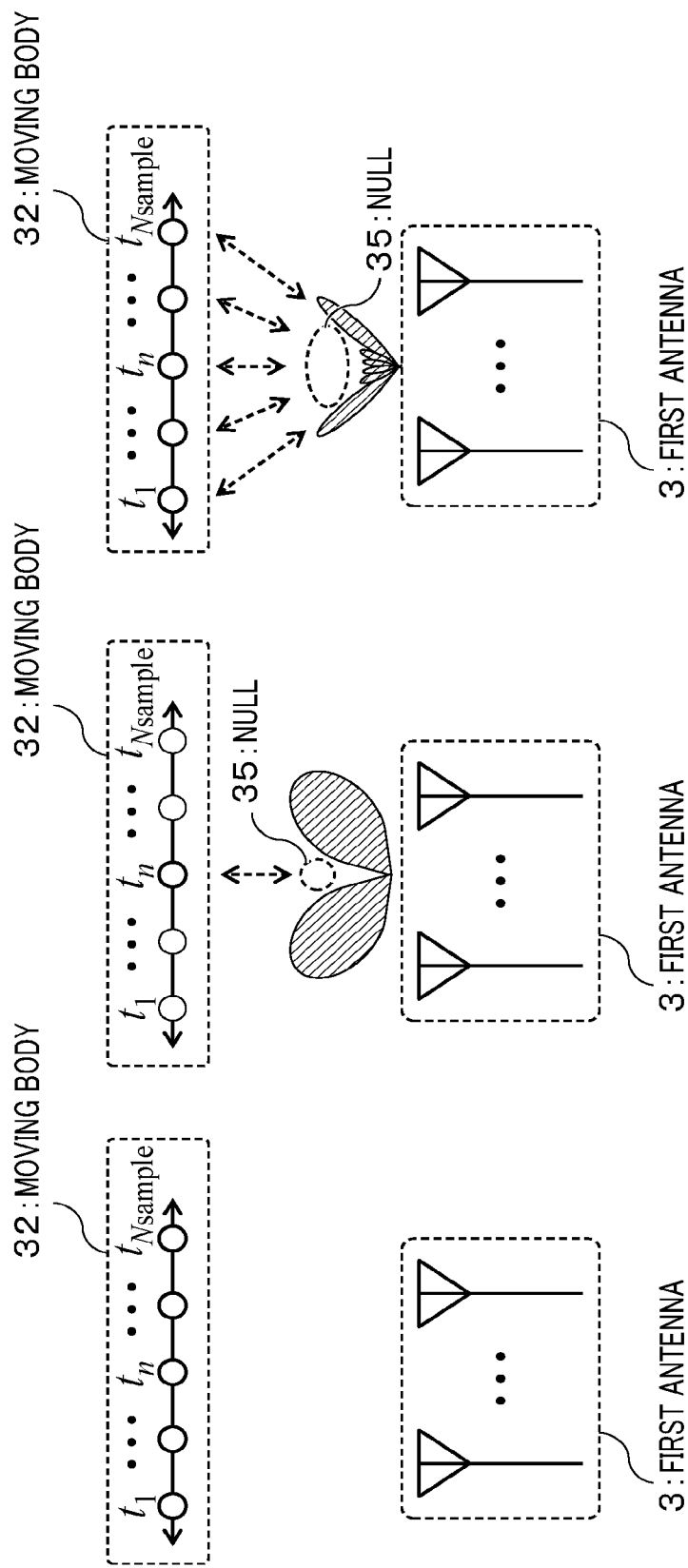

WIRELESS POWER TRANSMISSION DEVICE, WIRELESS POWER TRANSMISSION SYSTEM, AND WIRELESS POWER TRANSMISSION METHOD

CROSS REFERENCE TO RELATED APPLICATIONS

This application is based upon and claims the benefit of priority from the prior Japanese Patent Application No. 2018-173761, filed on Sep. 18, 2018, the entire contents of which are incorporated herein by reference.

FIELD

Embodiments of the present invention relate to a wireless power transmission device, a wireless power transmission system, and a wireless power transmission method.

BACKGROUND

Wireless power transmission is attracting attention. Since a radio wave with a high power density is transmitted in wireless power transmission using radio waves, in particular, it is required not to cause radio disturbance on wireless devices other than a power receiving device, and a power density of radio waves irradiated to a human body is required to be reduced to a predetermined value or less specified by international non-ionizing radiation protection committee (ICNIRP) or the like.

There has been proposed a technique of detecting an obstacle existing in a power transmission section from a power transmission device to a power receiving device, and changing a direction in which a radio wave is transmitted by the power transmission device so as not to irradiate the obstacle (person or animal).

However, estimation of a direction and a position of the obstacle requires hardware and software to realize a function for the estimation. In addition, since hardware and software of this type are affected by antennas, feeder lines, and peripheral components, regular or irregular calibration is required. Further, in estimating a direction and a position of the obstacle, an error occurs due to environmental conditions and the like. Furthermore, even if a main beam that maximizes the radiation of the radio wave is controlled such that the radio wave is not radiated at a position or in a direction of the obstacle, a radio wave is irradiated on a human body by a sub-beam generated secondarily, and a part of the human body is exposed to the radio wave if a range not radiated with the radio wave is too narrow, since the human body has a width.

BRIEF DESCRIPTION OF THE DRAWINGS

FIG. 5A is a view conceptually plotting a trajectory of first propagation path information in polar coordinates, FIG. 5B is a view conceptually plotting a point of a pseudo static propagation path after averaging the first propagation path information in polar coordinates, and FIG. 5C is a view conceptually plotting a trajectory of a pseudo dynamic propagation path in polar coordinates;

FIG. 6A is a view showing a position for each time of a moving body that makes vibration movement on a line, FIG. 6B is a view showing a state where a null is formed for the vicinity of a center of a trajectory in which the moving body makes vibration movement, and FIG. 6C shows a view showing a state where a plurality of nulls are connected to form a null in a wide range;

DETAILED DESCRIPTION

In the present embodiment, there is provided a wireless power transmission device including a power transmitter to transmit a wireless power signal through a plurality of first antennas;

a propagation path estimation unit to estimate first propagation path information characterizing a propagation path between the plurality of first antennas and a predetermined antenna, on the basis of a propagation path estimation signal having a same frequency as a frequency of the wireless power signal and being transmitted from the predetermined antenna;

a propagation path extraction unit to extract second propagation path information characterizing a propagation path passing through a moving body, on the basis of at least one of a difference on a time axis of a plurality of pieces of the first propagation path information each acquired at different times, and filtering on a frequency axis;

a weight calculator to calculate a weight vector that determines a directivity of a combined power transmission beam formed by the plurality of first antennas, on the basis of at least one of the first propagation path information and the second propagation path information; and a controller to control an amplitude and a phase of the wireless power signal inputted to each of the plurality of first antennas, on the basis of the weight vector.

Embodiments of the present invention is described below with reference to drawings. In the following embodiments, a characteristic configuration and an operation of a wireless power transmission device and a wireless power transmission system will be mainly described. However, the wireless power transmission device and the wireless power transmission system may have configurations and operations omitted in the following description.

First Embodiment

Figure 1:
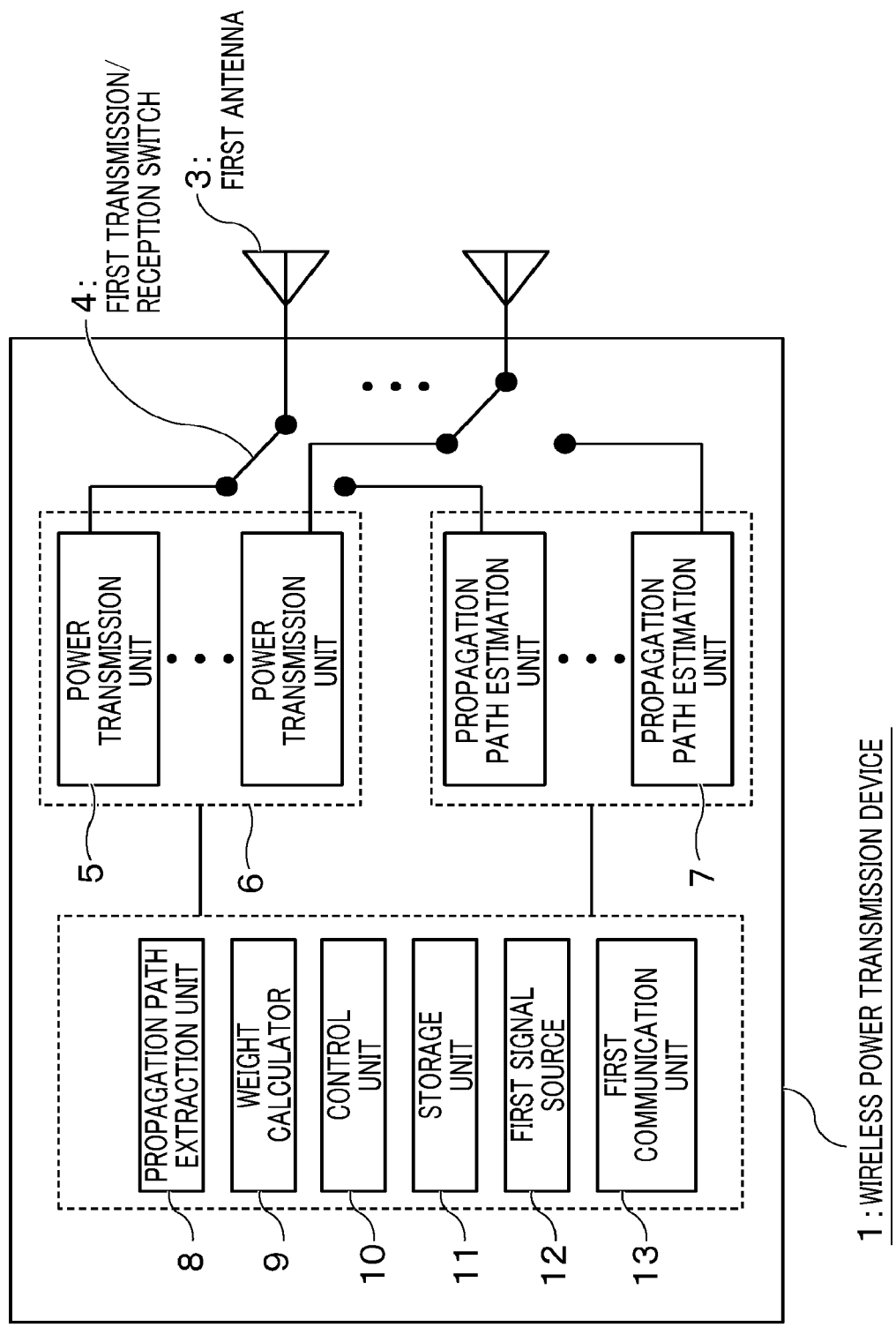
FIG. 1 is a block diagram showing a schematic configuration of a wireless power transmission device according to a first embodiment.

FIG. 1 is a block diagram showing a schematic configuration of a wireless power transmission device 1 according to a first embodiment.

Note that the wireless power transmission device 1 in this specification transmits a wireless power signal to a power receiving device 2 in FIG. 2 to be described later, and is also referred to as a power transmission device.

The wireless power transmission device 1 of FIG. 1 includes a plurality of first antennas 3, a first transmission/reception switch 4, a power transmitter 6 having a plurality of power transmission units 5, a plurality of propagation path estimation units 7, a propagation path extraction unit 8, a weight calculator 9, and a control unit 10.

The plurality of first antennas 3 are active phased array antennas, for example, and can control a combined power transmission beam formed by the plurality of first antennas 3, by controlling an amplitude and a phase of a wireless power signal inputted to each of the first antennas 3. The plurality of first antennas 3 can also receive a propagation path estimation signal from the power receiving device 2, in addition to transmitting the wireless power signal. The first transmission/reception switch 4 switches whether to transmit a wireless power signal or to receive a propagation path estimation signal from the power receiving device 2, through the plurality of first antennas 3.

The plurality of power transmission units 5 transmit a wireless power signal via the plurality of first antennas 3. A variable phase shifter and a variable amplifier are provided in each power transmission unit 5, and the controls of a phase value and an amplitude value set in the variable phase shifter and the variable amplifier enables control of a direction of the combined power transmission beam formed by the plurality of first antennas 3.

The propagation path estimation unit 7 estimates first propagation path information characterizing a propagation path between the plurality of first antennas 3 and a predetermined antenna, on the basis of a propagation path estimation signal having the same frequency as that of the wireless power signal received by the predetermined antenna.

In the present embodiment, the predetermined antenna is a second antenna 21 of the power receiving device 2. As will be described later, the power receiving device 2 transmits a propagation path estimation signal from the second antenna 21 in response to a request from the wireless power transmission device 1. Consequently, the propagation path estimation unit 7 according to the present embodiment estimates the first propagation path information characterizing the propagation path between the plurality of first antennas 3 and the second antenna 21, on the basis of the propagation path estimation signal transmitted from the power receiving device 2 through the second antenna 21.

The propagation path extraction unit 8 extracts second propagation path information characterizing a propagation path passing through a moving body, on the basis of at least one of a difference on a time axis of a plurality of pieces of the first propagation path information each acquired at different times, and filtering on a frequency axis. The moving body is, for example, a human body.

On the basis of at least one of the first propagation path information and the second propagation path information, the weight calculator 9 calculates a weight vector that determines a directivity of the plurality of first antennas 3.

The control unit 10 controls an amplitude and a phase of a wireless power signal inputted to each of the plurality of first antennas 3, on the basis of the weight vector.

The wireless power transmission device 1 of FIG. 1 may include a storage unit 11, a first signal source 12, and a first communication unit 13 in addition to the units described above.

The storage unit 11 stores a plurality of pieces of first propagation path information each acquired at different times. The propagation path extraction unit 8 reads out the plurality of pieces of first propagation path information stored in the storage unit 11, and extracts the second propagation path information characterizing a propagation path passing through the moving body.

The first signal source 12 generates a wireless power signal. The first communication unit 13 performs wireless communication with a second communication unit 25 in the power receiving device 2 to be described later. This wireless communication may conform to an existing wireless standard such as a radio frequency identifier (RFID), Bluetooth, or a wireless local area network (LAN), or may be other wireless systems. The first communication unit 13 transmits a transmission request for a propagation path estimation signal and the like, to the second communication unit 25.

Figure 2:
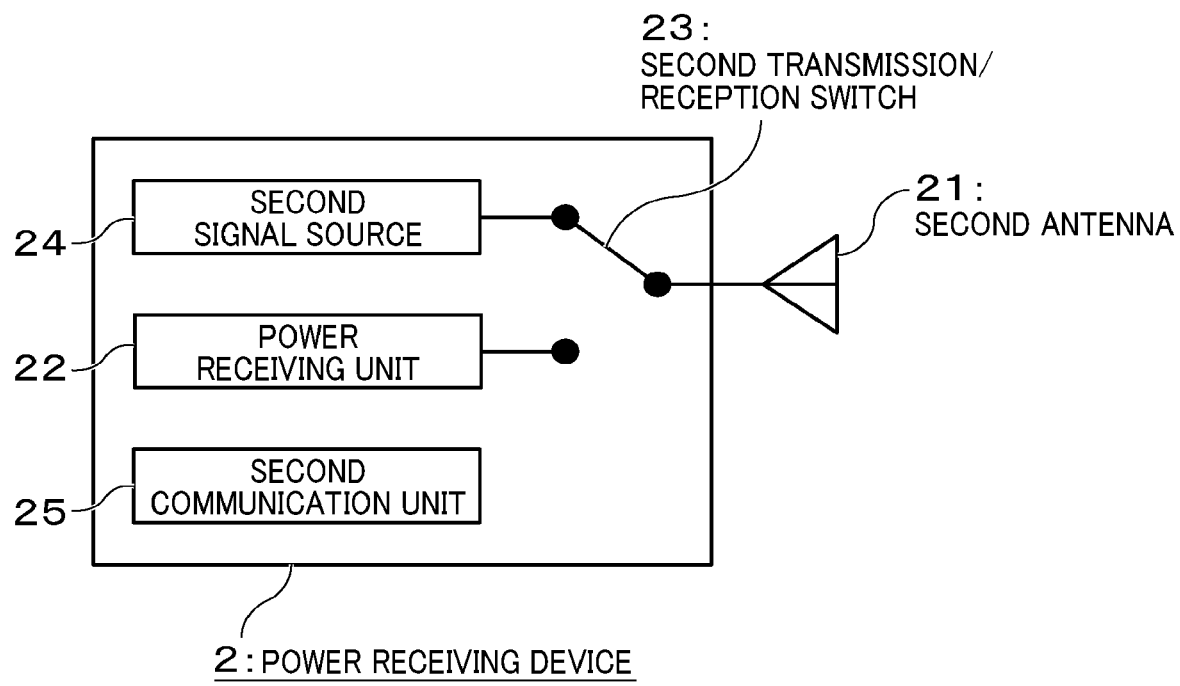
FIG. 2 is a block diagram showing a schematic configuration of a power receiving device according to the first embodiment.

FIG. 2 is a block diagram showing a schematic configuration of the power receiving device 2 according to the first embodiment. The power receiving device 2 in FIG. 2 includes the second antenna 21, a power receiving unit 22, a second transmission/reception switch 23, a second signal source 24, and the second communication unit 25. When a wireless power signal transmitted from the wireless power transmission device 1 is received by the second antenna 21, the power receiving unit 22 acquires the wireless power signal.

Upon receiving the transmission request for the propagation path estimation signal from the transmission unit, The second signal source 24 transmits a propagation path estimation signal via the second antenna 21.

Figure 3:
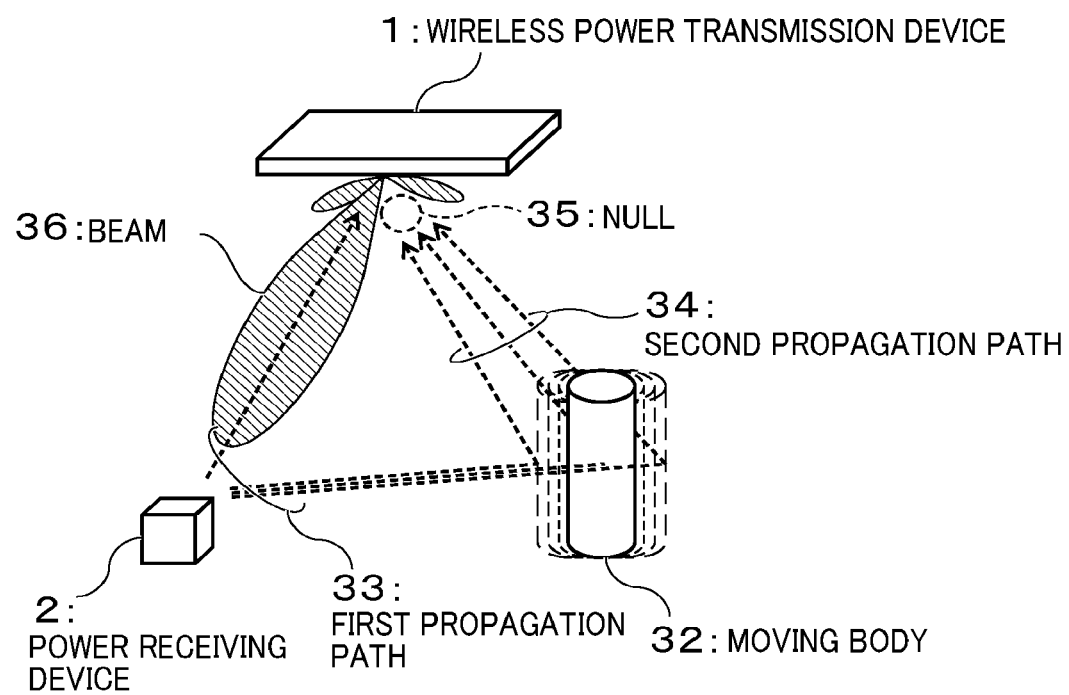
FIG. 3 is a view schematically showing a signal flow of a wireless power transmission system according to the first embodiment.
Figure 4:
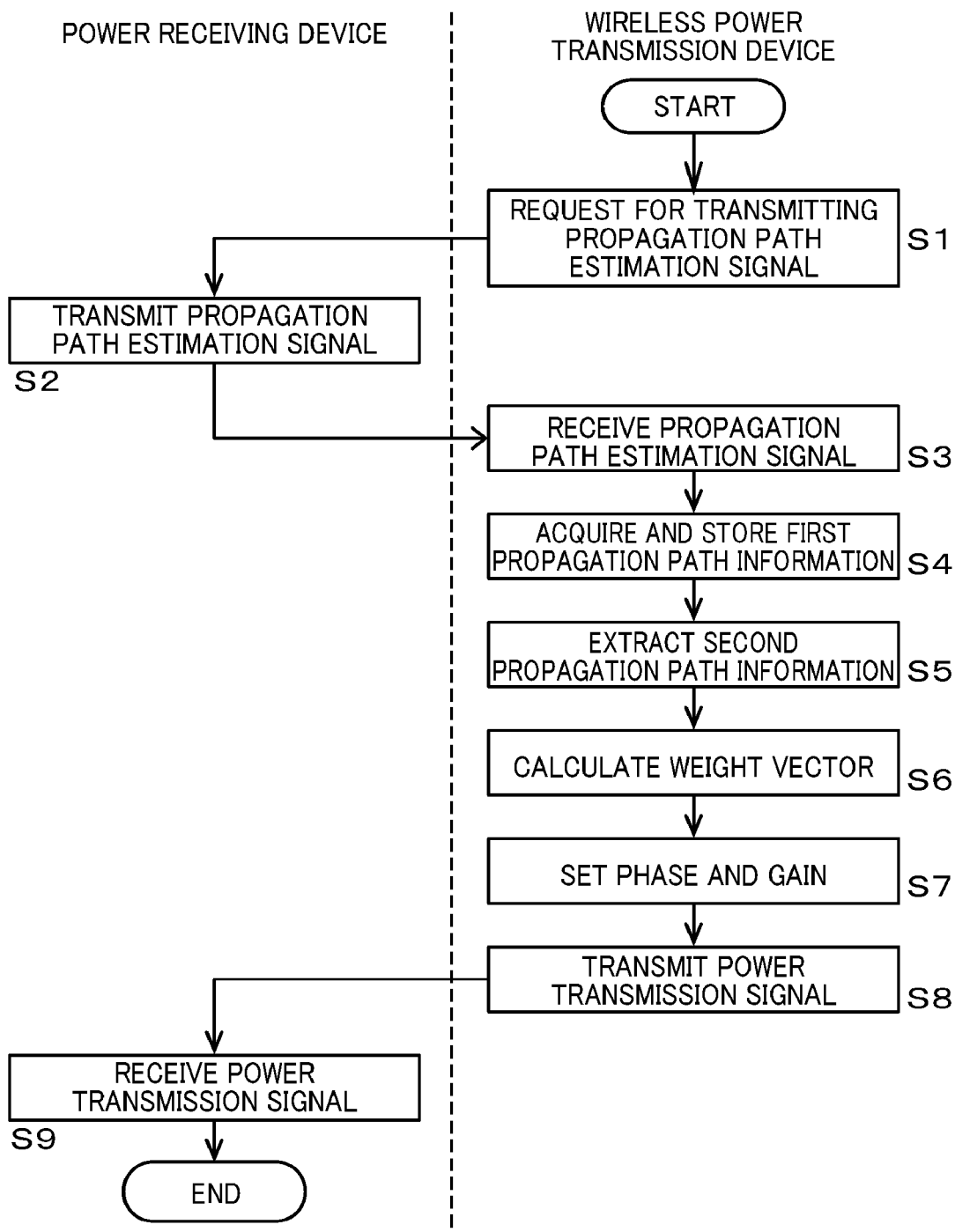
FIG. 4 is a flowchart showing a processing operation of the wireless power transmission system.

FIG. 3 is a view schematically showing a signal flow of a wireless power transmission system 31 according to the first embodiment, and FIG. 4 is a flowchart showing a processing operation of the wireless power transmission system 31. First, the wireless power transmission device 1 requests the second communication unit 25 in the power receiving device 2 to transmit a propagation path estimation signal, from the first communication unit 13 (step S1). Here, the propagation path estimation signal is a non-modulated continuous wave signal having the same frequency as that of the wireless power signal.

Upon receiving this request, the power receiving device 2 transmits a propagation path estimation signal generated by the second signal source 24 via the second antenna 21 (step S2). Meanwhile, when the power receiving device 2 transmits the propagation path estimation signal, the second transmission/reception switch 23 is connected to the second signal source 24 side.

The wireless power transmission device 1 receives the propagation path estimation signal through the plurality of first antennas 3 (step S3). Meanwhile, when the propagation path estimation signal is received, the first transmission/ reception switch 4 is connected to the propagation path estimation unit 7 side. The propagation path estimation unit 7 acquires propagation path information of an electromagnetic wave propagation path included in the received propagation path estimation signal. Here, the propagation path information indicates a complex transfer function of the propagation path. In the present specification, propagation path information included in the propagation path estimation signal and passing through a first propagation path 33 between the plurality of first antennas 3 and the second antenna 21 is referred to as first propagation path information. For example, assuming that the number of the plurality of first antennas 3 is NT, first propagation path information h1 ($t$) characterizing the first propagation path 33 between the NT pieces of the first antenna 3 and the second antenna 21 at a certain time t is expressed by the following Expression (1). Note that, in this specification, symbols representing matrices and vectors are underlined, and the underlined symbols correspond to matrices or vectors with the same symbols in boldface in expressions captured as an image.

$$h_1(t) = [h_{1,11}(t) \ldots h_{1,1N_T}(t)] \quad (1)$$

In Expression (1), h1 ($t$) is a complex vector of one row and NT columns, and a first row n-th column element h1,1$n$ ($t$) is a complex number indicating propagation path information between an n-th antenna among the plurality of first antennas 3 and the second antenna 21. Meanwhile, the propagation path information includes any form in which a complex vector given by Expression (1) is deformed/transformed.

Here, focusing on FIG. 3, the first propagation path information contains: (i) a static propagation path h0 representing a propagation path of a direct wave or a scattered wave from a fixed propagation environment; (ii) dynamic second propagation path information h2 ($t$) characterizing a second propagation path 34 of a scattered wave passing through a moving body 32; and (iii) other noise components hnoise ($t$). The first propagation path information can be expressed as in Expression (2).

$$h_1(t) = h_0 + h_2(t) + h_{noise}(t) \quad (2)$$

In Expression (2), h0 corresponds to the static propagation path information described above, and does not depend on the time t. Whereas, h2 ($t$) corresponds to the dynamic second propagation path information described above, and depends on a behavior of the moving body 32 and varies with time. The hnoise ($t$) is a noise component. Meanwhile, each of the above three components is a complex vector having the same size as h1 ($t$) of Expression (1).

The wireless power transmission device 1 receives a propagation path estimation signal for a plurality of times at different times, acquires a plurality of pieces of first propagation path information given by Expression (1), and stores the first propagation path information in the storage unit 11 in the wireless power transmission device 1 (step S4).

Next, the propagation path extraction unit 8 extracts second propagation path information required for forming a null 35 for the moving body 32 and passing through the moving body 32, from the first propagation path information given by Expression (1) (step S5).

Next, on the basis of the first propagation path information and the second propagation path information, the weight calculator 9 calculates a weight vector of an active phased array antenna of the wireless power transmission device 1, such that the null 35 can be formed for the moving body 32 while a power transmission beam 36 can be formed for the power receiving device 2 (step S6). The weight vector is a set of a phase value and an amplitude value that are set in the variable phase shifter and the variable amplifier provided in each power transmission unit 5 of the first antenna 3.

Here, the weight vector can be calculated by one of the following two methods.

[First Weight Calculation Method]

A first method is to extract second propagation path information through a difference between a plurality of pieces of first propagation path information in a time domain. As a prerequisite, firstly, assumptions are given as follows in Expression (1).

1) Static propagation path information h0 is to be constant without depending on a time t.

2) The moving body 32 makes vibration movement at a constant period T, and each element of dynamic second propagation path information h2 ($t$) passing through the moving body 32 is a complex exponential function of the period T. Note that the period T of the vibration movement of the moving body 32 is predictable or measurable in advance.

3) Each element of a noise component hnoise (t) is additive white Gaussian noise with variance $\sigma^2$ noise, and is to be sufficiently small as compared with levels of the static propagation path and the dynamic propagation path.

FIG. 5A is a view conceptually plotting a trajectory of a certain element of first propagation path information h1 ($t$) in polar coordinates under the above assumptions. Here, it is assumed that a sampling period Tsample for acquiring the first propagation path information h1 ($t$) is Tsample <T/2 on the basis of a sampling theorem, and a total of Nsample pieces of first propagation path information are acquired. Here, a plurality of the pieces of first propagation path information are averaged as in the following expression.

$$h'_0 = \frac{1}{N_{sample}} \sum_{n=1}^{N_{sample}} h_1(t_0 + (n-1)T_{sample}) \quad (3)$$

$$\approx h_0$$

In Expression (3), t0 is a time at which a first piece of the first propagation path information is acquired. Here, when Nsample is set to a large value, in the first propagation path information h1 ($t$) shown in Expression (2), an average value of the dynamic second propagation path information h2 ($t$) passing through the moving body 32 can be approximated to zero by periodicity thereof. Further, since the noise component hnoise (t) follows circularly symmetric complex Gaussian distribution with an average of zero, an average value thereof can also be approximated to zero. Whereas, since the static propagation path information h0 does not depend on the time t, a time average thereof is h0 itself. As a result, when an average value h'0 of the first propagation path information h1 ($t$) is calculated, the static propagation path information h0 alone remains, and h0 can be approximately extracted.

FIG. 5B is a view conceptually plotting a certain element of a pseudo static propagation path h'0 after averaging the first propagation path information h1 ($t$) of Expression (3), in polar coordinates.

Expression (4) is obtained by subtracting Expression (3) from Expression (2).

$$h'_2(t) = h_1(t) - h'_0 \quad (4)$$

$$\approx h_2(t)$$

In Expression (4), assuming that the average value h'0 can be approximated to the static propagation path information h0, and the noise component hnoise (t) in the first propagation path information h1 (t) shown in Expression (2) is sufficiently small and can be ignored, the dynamic second propagation path information h2 (t) can be approximately extracted by obtaining h'2 (t) of Expression (4).

FIG. 5C is a view conceptually plotting a trajectory of a certain element of pseudo dynamic propagation path information h'2 (t) obtained by Expression (4), in polar coordinates. For the pseudo dynamic propagation path information h'2 (t) obtained in Expression (4), a transmission correlation matrix R2 thereof is obtained by Expression (5).

$$R_2 = E[h'_2(t)^H h'_2(t)] \quad (5)$$

Here, H represents the Hermitian transpose of a complex matrix, and E [ ] means a time average. Meanwhile, it is obvious that a rank of the pseudo dynamic propagation path information h'2 (t) at a specific time is 1, but a rank of the transmission correlation matrix R2 is 1 or more by taking a time average of the correlation matrix.

Further, the correlation matrix R2 on the transmission side may be obtained as follows. First, a virtual propagation path matrix H'2 having the pseudo dynamic propagation path information h'2 (t) acquired at different times in each row vector is defined as in Expression (6).

$$H'_2 = \begin{bmatrix} h'_2(t_0) \\ \vdots \\ h'_2(t_0 + (N_{sample} - 1)T_{sample}) \end{bmatrix} \quad (6)$$

Here, a size of the virtual propagation path matrix H'2 is Nsample rows and NT columns. However, for convenience of forming the null 35, Nsample is set to be smaller than NT. Then, from the virtual propagation path matrix H'2 of Expression (6), the transmission correlation matrix R2 can be obtained as in Expression (7).

$$R_2 = H'_2{}^H H'_2 \quad (7)$$

Meanwhile, the rank of the transmission correlation matrix R2 is Nsample at maximum. However, in a case where there are ones highly correlated with each other among a plurality pieces of the pseudo dynamic propagation path information h'2 (t) acquired at different times, (e.g., in a case where two or more pieces of propagation path information are acquired at different times but when the moving body 32 is present at the same point or in the vicinity thereof), the rank of the transmission correlation matrix R2 is equal to or less than Nsample.

Here, all the transmission correlation matrices R2 obtained by Expressions (5) and (7) are Hermitian matrices. Therefore, Expression (5) and Expression (7) can be eigenvalue decomposed as follows.

$$R_2 = V_2 \Lambda_2 V_2^H \quad (8)$$

In Expression (8), V2 is an eigenvector matrix of the transmission correlation matrix R2, and is given as follows.

$$V_2 = [v_{2,1} \ldots v_{2,N_T}] \quad (9)$$

The n-th vector v2,n of Expression (9) is an eigenvector of an n-th eigenmode. Whereas, Λ2 is a diagonal matrix having an eigenvalue of the transmission correlation matrix R2 as a diagonal element, and is given as in the following expression.

$$\Lambda_2 = \text{ding}(\lambda_{2,1} \ldots \lambda_{2,N_T}) \quad (10)$$

Here, λ2,n of an n-th diagonal line is an eigenvalue of the n-th eigenmode, a largest eigenvalue is set as a first eigenvalue, and each eigenvalue is defined in descending order as follows.

$$\lambda_{2,1} \geq \ldots \geq \lambda_{2,N_{rank}} \geq \lambda_{2,N_{rank}+1} \approx \ldots \approx \lambda_{2,N_T} \approx \sigma_{noise}^2 \quad (11)$$

In Expression (11), Nrank represents the rank of the transmission correlation matrix R2, and shows a value approximately equal to the variance σ²noise of each element of the noise component hnoise (t), for eigenvalues after the Nrank.

Here, the eigenmode conceptually represents an equivalent propagation path between the wireless power transmission device 1 and the power receiving device 2, in a case where a certain eigenvector of Expression (9) is used as a weight vector of the active phased array antenna of the wireless power transmission device 1. The eigenvalue represents a strength of the equivalent propagation path. In particular, the eigenmode of the second propagation path information h2 (t) represents an equivalent propagation path passing through the moving body 32. An eigenmode having a larger eigenvalue means that scattering in the moving body 32 is more conspicuous, that is, the moving body 32 is irradiated with more electromagnetic waves.

Therefore, from the viewpoint of reducing the exposure of the moving body 32 with electromagnetic waves, it is desirable to use an eigenvector having a small corresponding eigenvalue (that is, small irradiation of the moving body 32 with electromagnetic waves) among the eigenvectors of V2 in Expression (9), for the weight of the active phased array antenna of the wireless power transmission device 1. Particularly, in Expression (11), eigenvalues after the Nrank have approximately equal values as the variance σ²noise of each element of the noise component hnoise (t), indicating that irradiation of the moving body 32 with electromagnetic waves is particularly small for the eigenmodes corresponding to these eigenvalues. Consequently, among the eigenvectors of V2 in Expression (9), eigenvectors after the N rank are defined as in the following expression as a pre-weight matrix of the active phased array antenna of the wireless power transmission device 1.

$$W_{NS} = [v_{2,N_{rank}+1} \ldots v_{2,N_T}] \quad (12)$$

Here, each column vector (weight) included in Expression (12) conceptually forms a directivity that directs the null 35 to the moving body 32.

FIGS. 6A to 6C show conceptual views of a directivity formed by the pre-weight matrix that is of Expression (12) and obtained from the transmission correlation matrix R2 of Expressions (5) and (7). FIG. 6A is a view showing a position for each time of the moving body 32 that makes vibration movement on a line.

First, in Expression (5), a time average of a correlation matrix of the pseudo dynamic propagation path information h'2 (t) is defined as the transmission correlation matrix R2. In this case, a principal eigenmode of the transmission correlation matrix R2 corresponds to a propagation path for the vicinity of a center of a trajectory of the moving body 32 making vibration movement (that is, a position with a high existence probability of the moving body 32). Consequently, the directivity formed by the pre-weight matrix obtained on the basis of Expression (5) forms the null 35 for the vicinity of the center of the trajectory of the moving body 32 making vibration movement (that is, a position with a high existence probability of the moving body 32). (See FIG. 6B)

Whereas, in Expression (7), a correlation matrix of the virtual propagation path matrix H'2 having the pseudo dynamic propagation path information h'2 (t) acquired at different times in each row vector is defined as the transmission correlation matrix R2. In this case, a rank of the transmission correlation matrix R2 is to be Nsample at maximum, and at this time, the first to Nsample-th eigenmodes represent equivalent propagation paths corresponding to individual positions where the moving body 32 is present at different times. Therefore, the directivity formed by the pre-weight matrix obtained on the basis of Expression (7) forms the null 35 for each position where the moving body 32 is present at different times, causing the plurality of nulls 35 to be connected and forming the null 35 in a wide range. (See FIG. 6C)

Subsequently, a weight vector for forming the power transmission beam 36 is derived for the power receiving device 2, while the pre-weight matrix of Expression (12) is used. First, the following expression is obtained by multiplying the pseudo static propagation path h'0 obtained in Expression (3) by a pre-weight matrix $W_{NS}$ obtained by Expression (12).

$$h''_0 = h'_0 W_{NS} \quad (13)$$

That is, h"0 in Expression (13) indicates a pseudo static propagation path in a case where the null 35 is formed for the moving body 32. Here, a size of h"0 in Expression (13) is one row and (NT—Nrank) columns.

In Expression (13), a post-weight vector that maximizes power transmission efficiency for the power receiving device 2 is given as in the following expression.

$$w_{BF} = h''^H_0 / \|h''_0\|_2 \quad (14)$$

In Expression (14), $\| \|_2$ represents an L2 norm of a complex vector. Here, an n-th element of $w_{BF}$ represents a weighting coefficient multiplied by an n-th column vector of $W_{NS}$ given by Expression (12). In a case of $w_{BF}$ given by Expression (14), in particular, a directivity in using each column vector of $W_{NS}$ as a weight is combined so as to intensify in the same phase at a point of the second antenna 21 of the power receiving device 2, resulting in formation of the power transmission beam 36 for the power receiving device 2.

Finally, the following Expression (15) gives a weight vector for forming the power transmission beam 36 for the power receiving device 2, while the null 35 is formed for the moving body 32 from Expressions (12) and (14). In the Expression (15), $W_{NS}$ is a formation of null for moving body, and $w_{BF}$ is a formation of beam for power receiving device.

$$\omega = W_{NS} \omega_{BF} \quad (15)$$

Here, a weight vector w of Expression (15) is a complex vector of NT rows and one column, and an amplitude and a phase of an n-th element thereof correspond to a gain and a phase component that are set in the amplifier and the variable phase shifter of the power transmission unit 5 of an n-th antenna among the plurality of first antennas 3.

[Second Weight Calculation Method]

A second method is to extract second propagation path information by converting a plurality of pieces of first propagation path information in a time domain into first propagation path information in a frequency domain, and filtering first propagation path information in a frequency band including a frequency derived from a behavior of the moving body 32. Note that, in the following derivation, assumptions similar to those of [first weight calculation method] are used.

Here, similarly to [first weight calculation method], it is assumed that a sampling period Tsample for acquiring first propagation path information h1 (t) is Tsample<T/2 on the basis of a sampling theorem, and a total of Nsample pieces of first propagation path information are acquired.

Figures 7A, 7B:
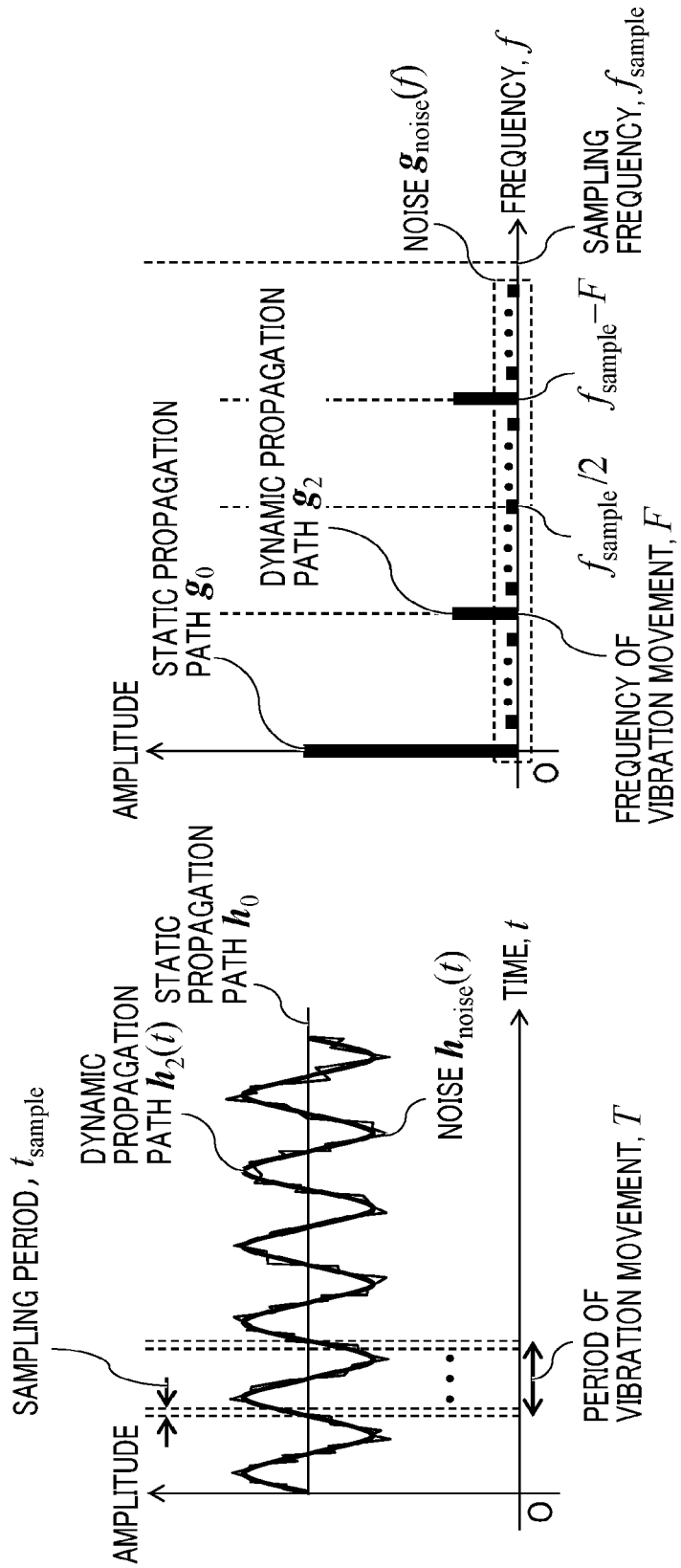
FIG. 7A is a view conceptually showing first propagation path information in a time domain.
FIG. 7B is a view conceptually showing first propagation path information in a frequency domain.

FIG. 7A conceptually illustrates a certain element of the first propagation path information h1 (t) in a time domain given by Expression (2). The first propagation path information h1 (t) contains: static propagation path information h0 not depending on a time; dynamic second propagation path information h2 (t) passing through the moving body 32 making vibration movement at the period T; and a noise component hnoise (t).

By applying the discrete Fourier transformation to the Nsample pieces of first propagation path information h1 (t) in a time domain acquired with the sampling period Tsample, first propagation path information g1 (f) in a frequency domain given by the following expression is obtained.

$$g_1(f) = [g_{1,11}(f) \cdots g_{1,1N_T}(f)] \quad (16)$$

FIG. 7B is a view conceptually showing first propagation path information g1 (f) in a frequency domain. First, a noise component gnoise (f) in a frequency domain ideally exists at the same level in all frequencies due to a property of additive white Gaussian noise. Next, static propagation path information g0 appears as a DC component (f=0) of the first propagation path information g1 (f) in a frequency domain, and is given as in the following expression.

$$g_0 = g_1(0) \quad (17)$$

Whereas, dynamic second propagation path information g2 in a frequency domain appears as a component of a frequency F of the vibration movement of the moving body 32 out of the first propagation path information g1 (f) in a frequency domain, and is given as in the following expression.

$$g_2 = g_1(F) \quad (18)$$

Note that there is a relationship of F=1/T between the period T and the frequency F of the vibration movement of the moving body 32. Therefore, the pre-weight matrix $W_{NS}$ for forming the null 35 for the moving body 32 can be obtained similarly to the [first weight calculation method], from the dynamic second propagation path information g2 in a frequency domain out of the first propagation path information g1 (f) in a frequency domain.

However, in the above description, it is assumed that the dynamic second propagation path information g2 in a frequency domain is included in a component of f=F out of the first propagation path information g1 (f) in a frequency domain, and the dynamic second propagation path information g2 does not necessarily appear in the component of f=F in a case where there is an error in the frequency (period) of the vibration movement of the moving body 32 predicted or measured in advance, or where the vibrating movement of the moving body 32 includes a different frequency component. Therefore, by defining a range of the vibration frequency that may be included in the vibration movement of the moving body 32 and using the plurality of pieces of the first propagation path information g1 (f) in a frequency domain in that range, it is possible to more reliably extract the dynamic second propagation path information.

For example, the transmission correlation matrix R2 can be obtained by obtaining each correlation matrix of the plurality of pieces of first propagation path information g1 (f) in a frequency domain as in Expression (5) of [First weight calculation method] in a time domain and averaging on a frequency axis, or by rearranging the first propagation path information g1 (f) at each frequency point as in Expressions (6) and (7) to construct a virtual propagation path matrix and obtaining the correlation matrix.

The pre-weight matrix $W_{NS}$ for forming the null 35 for the moving body 32 can be obtained by the eigenvalue decomposition of the transmission correlation matrix R2 as in Expressions (8) to (12). Subsequently, a post-weight vector $w_{BF}$ for forming the power transmission beam 36 for the power receiving device 2 is calculated from the static propagation path information g0 in a frequency domain and the obtained pre-weight matrix $W_{NS}$, as in Expressions (13) and (14). Finally, the weight vector w for forming the power transmission beam 36 for the power receiving device 2 is obtained, while the null 35 is formed for the moving body 32, by multiplying the pre-weight matrix $W_{NS}$ and the post-weight vector $w_{BF}$ similarly to Expression (15).

After calculating the weight vector w by the above-described first or second weight calculation method, the control unit 10 in the wireless power transmission device 1 sets a gain of the variable amplifier and a phase value of the variable phase shifter in the power transmission unit 5 connected to the plurality of first antennas 3, on the basis of the amplitude and phase information of the weight vector w (step S7).

Here, in practice, it may not be possible to precisely realize an amplitude ratio of the weight vector w, depending on a dynamic range (a settable gain range) of the variable amplifier. In this case, out of the weight vector w, the gain of the variable amplifier of the power transmission unit 5 of the first antenna 3 corresponding to an element having a maximum amplitude is set as an upper limit value of the dynamic range. Then, out of the weight vector w, the gain of the variable amplifier of the power transmission unit 5 of the first antenna 3 corresponding to an element having an amplitude equal to or less than a lower limit value of the dynamic range can be clipped with the lower limit value of the dynamic range.

Further, in a case where the gain of the variable amplifier and the phase of the variable phase shifter are discretely controlled, an amplitude and a phase of each element of the weight vector w may be rounded to a value close to a discrete value of a settable gain of the variable amplifier and a settable phase of the variable phase shifter.

Thereafter, a power transmission signal transmitted from the first signal source 12 is transmitted to the power receiving device 2 via the power transmission unit 5 and the plurality of first antennas 3 (step S8). In the power receiving device 2, the power transmission signal is received via the second antenna 21 (step S9), and the DC power is generated in the power receiving unit 22. At this time, a first transmission/reception switch 4 is connected to the power transmission unit 5 side, and the second transmission/reception switch 23 is connected to the power receiving unit 22.

As described above, in the first embodiment, the first propagation path information between the plurality of first antennas 3 in the wireless power transmission device 1 and the second antenna 21 is estimated on the basis of the propagation path estimation signal transmitted from the power receiving device 2; the second propagation path information passing through the moving body 32 is extracted on the basis of the first propagation path information; the weight vector of the plurality of first antennas 3 is determined on the basis of the first propagation path information and the second propagation path information; and the amplitude and the phase of the wireless power signal inputted to the plurality of first antennas 3 are controlled on the basis of the weight vector. This makes it possible to transmit power to the power receiving device 2 with high efficiency while reducing the exposure of the moving body 32 with the electromagnetic waves, without requiring a direction or position information of the moving body 32.

Second Embodiment

In the above-described first embodiment, the example has been described in which the first propagation path information and the second propagation path information are acquired on the basis of the propagation path estimation signal transmitted from the power receiving device 2, and power is transmitted to the power receiving device 2 with high efficiency while the null 35 is formed for the moving body 32. However, from the viewpoint of power saving and downsizing of the power receiving device 2, it is desirable that the propagation path information can be estimated between the wireless power transmission device 1 and the power receiving device 2 without transmission of the propagation path estimation signal from the power receiving device 2.

As an alternative to the propagation path estimation signal, a communication signal may be transmitted via the second antenna 21 of the power receiving device 2, and on the basis of this communication signal, a relative direction or position information of the power receiving device 2 with respect to the wireless power transmission device 1 may be estimated, rather than the exact propagation path information.

Figure 8:
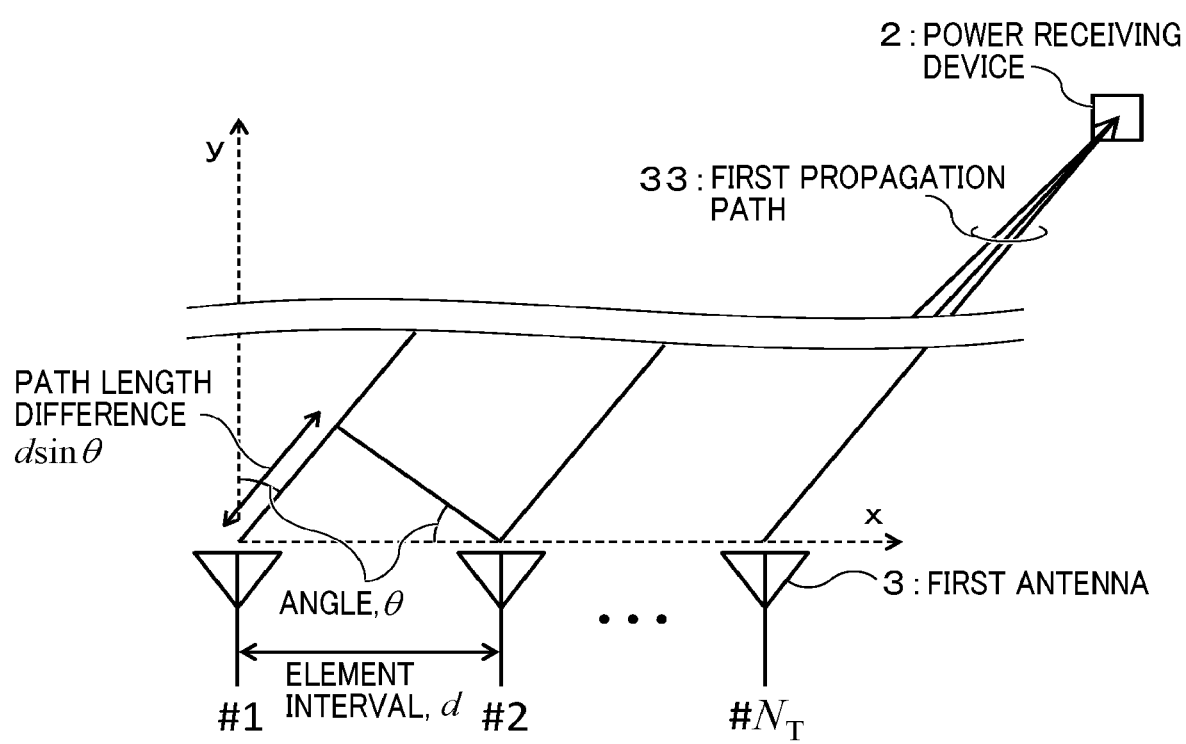
FIG. 8 is a view showing an example in which the power receiving device is arranged in a direction of an angle θ from a y axis with respect to an array of a plurality of first antennas arranged linearly at equal element intervals on an x axis.

For example, as shown in FIG. 8, in a case where the power receiving device 2 is arranged in a direction of an angle θ from a y axis with respect to an array of a plurality of the first antennas 3 arranged linearly at equal element intervals d on an x axis, an array response vector (that is, first propagation path information h1 considering a direct wave component alone) is given by the following expression. Meanwhile, it is also possible to define an array response vector of any array shape, with a similar way of thinking.

$$h_1 = [1\ e^{jkd\sin\theta} \ldots e^{jk(N_T-1)d\sin\theta}] \quad (19)$$

In Expression (19), k represents a wave number at a frequency of a power transmission signal. Here, when the power receiving device 2 exists in a line-of-sight environment, first propagation path information calculated on the basis of a propagation path estimation signal from the power receiving device 2 and propagation path information given by Expression (19) are substantially equivalent. Further, since a level of a scattered wave component generally becomes smaller than a direct wave component even in a scattering environment, it is possible to obtain a power transmission efficiency equal to a power transmission efficiency in a case where power is transmitted on the basis of the exact first propagation path information substantially by calculating a weight vector so as to form a power transmission beam 36 on the basis of Expression (19). Further, since the formed power transmission beam 36 has a constant width, a possibility that the power transmission efficiency is extremely degraded is low even if there is an estimation error in a direction or position information of the power receiving device 2.

Whereas, as described above, it is difficult to form an appropriate null 35 for the moving body 32 on the basis of the direction or the position information. Therefore, it is necessary to acquire propagation path information between the wireless power transmission device 1 and the moving body 32 through some means.

Accordingly, in the present embodiment, a wireless power transmission device 1 transmits a propagation path estimation signal, and a scattered wave from a moving body 32 is received by a plurality of first antennas 3 of the wireless power transmission device 1, thereby acquiring propagation path information between the wireless power transmission device 1 and the moving body 32, and forming a null 35 for the moving body 32 on the basis of the propagation path information.

Figure 9:
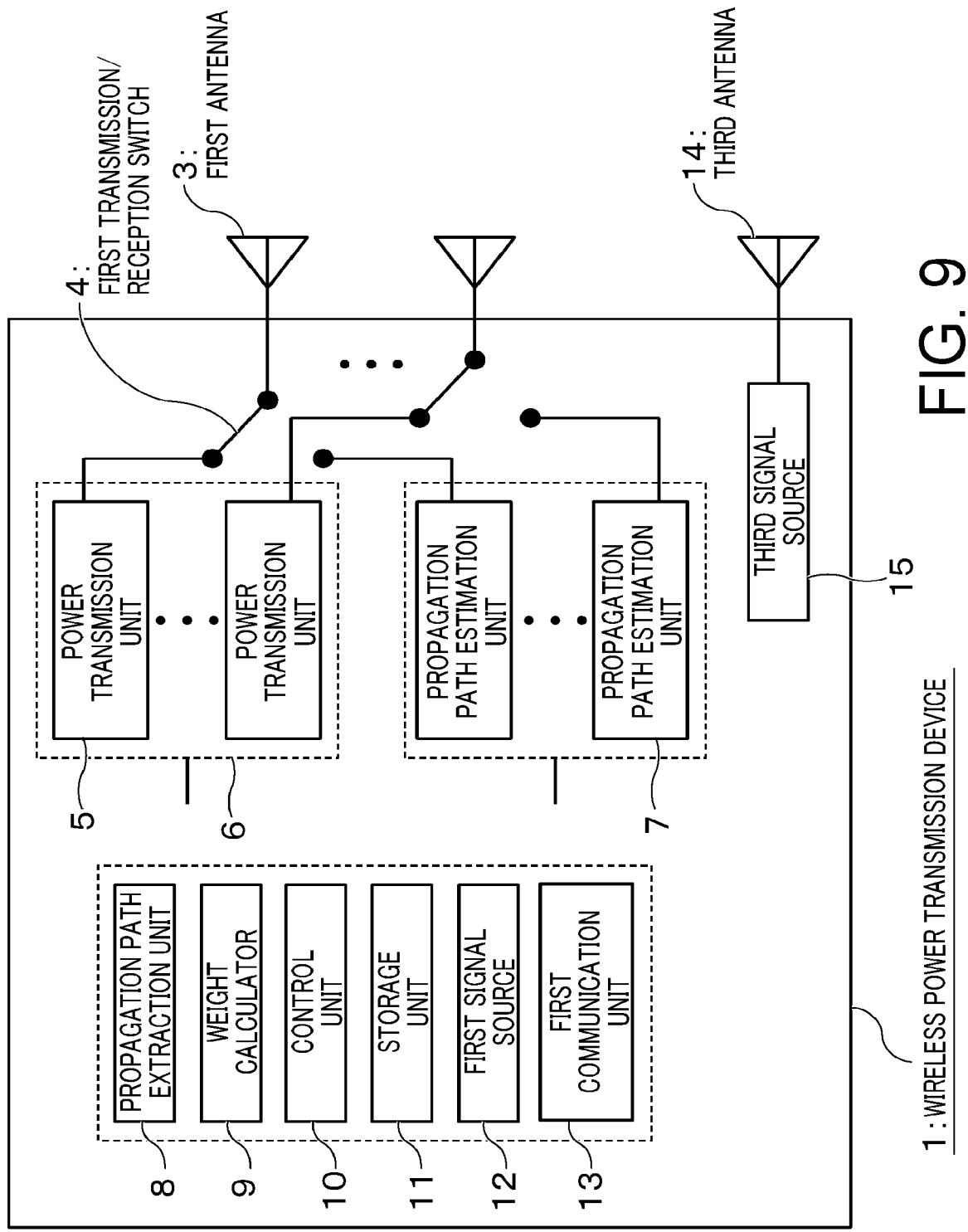
FIG. 9 is a block diagram showing a schematic configuration of a wireless power transmission device according to a second embodiment.

FIG. 9 is a block diagram showing a schematic configuration of the wireless power transmission device 1 according to a second embodiment.

Unlike the wireless power transmission device 1 shown in FIG. 1, there are provided a third antenna 14 to transmit a propagation path estimation signal, and a third signal source 15 to generate a propagation path estimation signal.

Figure 10:
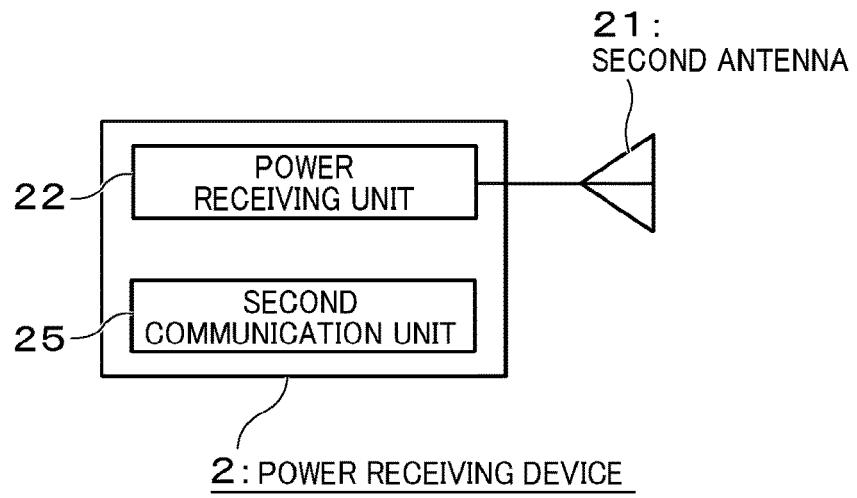
FIG. 10 is a block diagram showing a schematic configuration of a power receiving device according to the second embodiment.

FIG. 10 is a block diagram showing a schematic configuration of a power receiving device 2 according to the second embodiment. Unlike the power receiving device 2 shown in FIG. 2, the second transmission/reception switch 23 to switch to a mode for transmitting the propagation path estimation signal and the second signal source 24 to generate the propagation path estimation signal are unnecessary.

Figure 11:
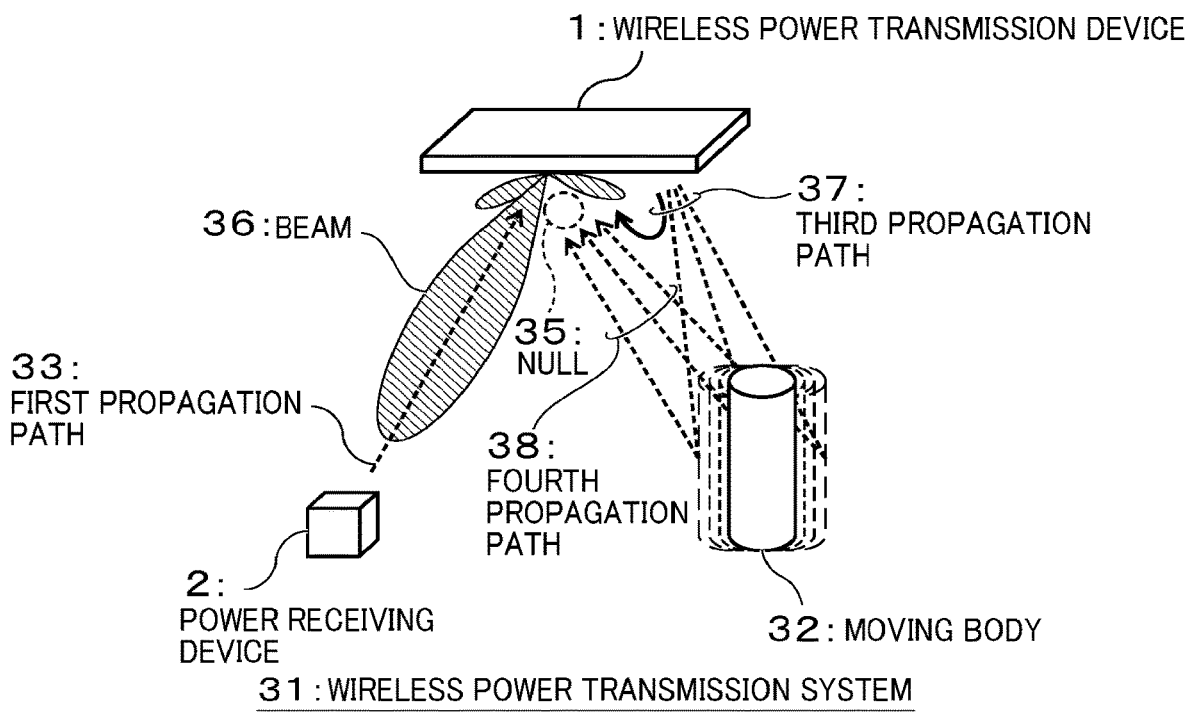
FIG. 11 is a view schematically showing a signal flow of a wireless power transmission system according to the second embodiment.

FIG. 11 is a view schematically showing a signal flow of a wireless power transmission system 31 according to the second embodiment. In the wireless power transmission system 31 of FIG. 11, the wireless power transmission device 1 transmits a power transmission signal via a power transmission unit 5, and a power receiving unit 22 in the power receiving device 2 receives the power transmission signal, whereby power transmission is carried out.

Note that a control flow in the second embodiment is the same as the wireless power transmission control flow in the first embodiment shown in FIG. 4, except that "direction estimation processing of the power receiving device 2 is performed in advance" and "transmission of the propagation path estimation signal is performed by the wireless power transmission device 1 itself". For example, in the first embodiment, the dynamic second propagation path information between the first antenna 3 and the moving body 32 is extracted from the propagation path estimation signal that is transmitted by the power receiving device 2, is scattered by the moving body 32, and arrives at the plurality of first antennas 3. Whereas, in the second embodiment, third propagation path information between the third antenna 14 and the plurality of first antennas 3 is acquired by transmitting a propagation path estimation signal from the third signal source 15 in the wireless power transmission device 1 into an environment via the third antenna 14, and receiving the signal scattered in the environment by the plurality of first antennas 3. Here, similarly to Expression (2), the third propagation path information contains: (i) a static propagation path representing a propagation path of a direct wave or a scattered wave from a fixed propagation environment; (ii) dynamic fourth propagation path information characterizing a fourth propagation path 38 of a scattered wave passing through the moving body 32; and (iii) other noise components.

Among them, the fourth propagation path information passing through the moving body 32 is extracted by either or both of a difference on a time axis or filtering on a frequency axis similarly to that of the first embodiment, and a pre-weight matrix for forming the null 35 for the moving body 32 is calculated, on the basis of the fourth propagation path information. Thereafter, a post-weight vector for forming the power transmission beam 36 for the power receiving device 2 is calculated from the pre-weight matrix and the first propagation path information between the wireless power transmission device 1 and the power receiving device 2, the information being given by Expression (19). Then, by multiplying the pre-weight matrix and the post-weight vector, the null 35 is formed for the moving body 32, and the weight vector for forming the power transmission beam 36 for the power receiving device 2 is obtained.

As described above, in the second embodiment, a function for transmitting the propagation path estimation signal is given to the wireless power transmission device 1 side, which has relatively less power constraints and implementation constraints. This can simplify an internal configuration of the power receiving device 2, reduce a load of the power receiving device 2, and also suppress the power consumption of the power receiving device 2.

Third Embodiment

In the above-described second embodiment, the example has been described in which the fourth propagation path information between the wireless power transmission device 1 and the moving body 32 is acquired on the basis of the propagation path estimation signal transmitted from the third signal source 15 included in the wireless power transmission device 1 via the third antenna 14, and a beam corresponding to the direction or the position information of the power receiving device 2 is transmitted while the null 35 for the moving body 32 is formed.

However, in the wireless power transmission device 1 of FIG. 9, the third antenna 14 and the third signal source 15 are additionally required, an internal configuration of the wireless power transmission device 1 becomes complicated, and a device cost also increases.

Accordingly, in the present embodiment, a part or all of a plurality of first antennas 3 included in a wireless power transmission device 1 are used as one or more third antennas 14. That is, among the plurality of first antennas 3, at least a part of the first antennas 3 transmits a propagation path estimation signal.

For example, as an alternative to the third antenna 14 used for transmission of a propagation path estimation signal, the plurality of first antennas 3 are grouped into a plurality of subarrays, a part of subarrays is used for transmission of a wireless power signal and reception of a propagation path estimation signal, and the remaining subarrays are used for transmission of a propagation path estimation signal. Note that both the wireless power signal and the propagation path estimation signal are non-modulated continuous wave signals having the same frequency. Therefore, the wireless power signal generated by a first signal source 12 and reduced in its output level may alternatively be used as the propagation path estimation signal.

Figure 12:
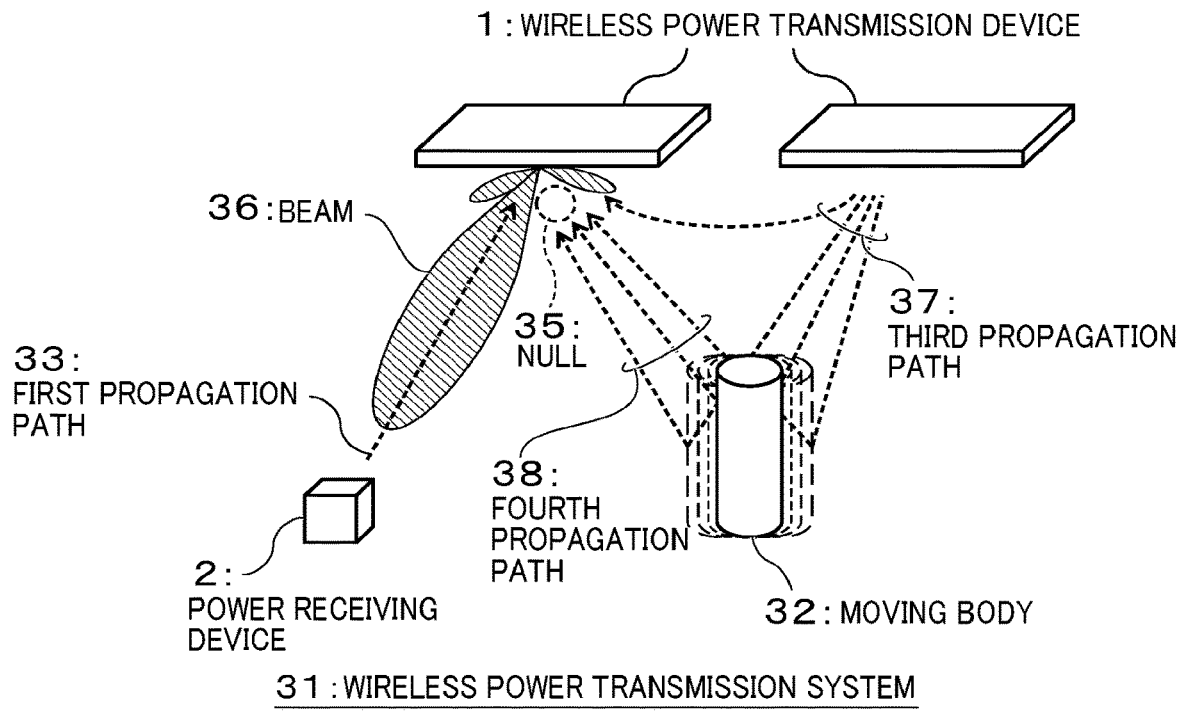
FIG. 12 is a view showing a schematic configuration of a wireless power transmission system according to a third embodiment.

FIG. 12 is a view showing a schematic configuration of a wireless power transmission system 31 according to a third embodiment, and shows an example in which the wireless power transmission device 1 is divided into two blocks in order to distinguish the plurality of first antennas 3 divided into the plurality of subarrays. Note that the wireless power transmission device 1 divided into a plurality of blocks may be regarded as a network including a plurality of wireless power transmission devices 1, and the plurality of wireless power transmission devices 1 may be wired or wirelessly connected with each other. A control flow of the third embodiment is the same as that of the second embodiment, in which the wireless power transmission device 1 transmits a propagation path estimation signal in a third propagation path 37 by using a part of the first antennas 3; and on the basis of the propagation path information between the subarrays, the information including the propagation path information scattered by the moving body 32 and reaching the first antenna 3 via a fourth propagation path 38, a null 35 is formed for the moving body 32, and a weight vector for forming a power transmission beam 36 for a power receiving device 2 is calculated.

As described above, in the third embodiment, since a part of the plurality of first antennas 3 used for transmission of the wireless power signal is used for transmission of the propagation path estimation signal, it is unnecessary to provide a dedicated antenna for transmission of the propagation path estimation signal in the wireless power transmission device 1. Further, by alternatively using the wireless power signal generated by the first signal source 12 having a reduced output level as the propagation path estimation signal, it is not necessary to provide a dedicated signal source for generation of the propagation path estimation signal. Therefore, it is possible to downsize the wireless power transmission device 1 and to reduce the manufacturing cost.

Fourth Embodiment

In the above-described third embodiment, a part or all of the plurality of first antennas 3 included in the wireless power transmission device 1 is used as the third antenna 14 for transmission of the propagation path estimation signal, which eliminates necessity of a dedicated antenna for transmission of the propagation path estimation signal, and simplifies the system configuration.

However, coupling between the first antenna 3 and the third antenna 14 that are arranged in a limited space in the same wireless power transmission device 1 is not negligible. As compared with a radio wave intensity of the propagation path estimation signal that is transmitted from the third antenna 14, scattered within a propagation environment, and received by the first antenna 3, a radio wave intensity of the propagation path estimation signal reaching the first antenna 3 directly from the third antenna 14 is extremely large. Therefore, there is a possibility that an input signal level of the propagation path estimation unit 7 is saturated or the propagation path estimation unit 7 is damaged due to the radio wave intensity of the propagation path estimation signal reaching the first antenna 3 directly from the third antenna 14. This phenomenon is called self interference. A simple measure to improve the self interference includes: setting a large distance between the first antenna 3 and the third antenna 14; directing the first antenna 3 and the third antenna 14 in opposite directions; and providing a decoupling mechanism between the first antenna 3 and the third antenna 14 (absorber, shield, or the like). However, this becomes a big restriction on implementation.

Accordingly, in the present embodiment, the problem of the self interference is solved by using a moving-body detection device provided separately from a wireless power transmission device 1 and a power receiving device 2.

Figure 13:
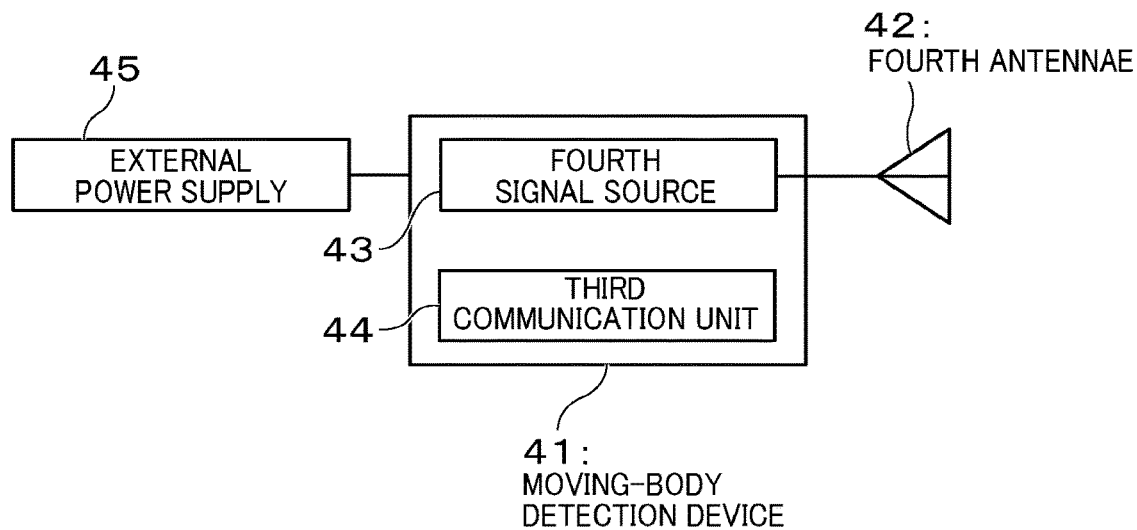
FIG. 13 is a block diagram showing a schematic configuration of a moving-body detection device according to a fourth embodiment.

FIG. 13 is a block diagram showing a schematic configuration of a moving-body detection device 41 according to a fourth embodiment.

The moving-body detection device 41 of FIG. 13 includes a fourth antenna 42, a fourth signal source 43, and a third communication unit 44. The fourth antenna 42 transmits a propagation path estimation signal in response to a transmission request from the wireless power transmission device 1. The fourth signal source 43 generates a propagation path estimation signal by using electric power from an external power supply device 45 that is externally attached to the moving-body detection device 41. The third communication unit 44 performs wireless communication between a second communication unit 25 in the wireless power transmission device 1 and the third communication unit 44 in the power receiving device 2.

In addition to this, the moving-body detection device 41 of FIG. 13 may include a moving-body detection sensor (e.g., a camera, a pyroelectric sensor, or a human sensor such as a sonar). For example, the moving-body detection device 41 may transmit the propagation path estimation signal after detecting the presence of a moving body 32 with the moving-body detection sensor. Since there is no particular limitation on an arrangement location of the moving-body detection device 41, it is possible to arrange the wireless power transmission device 1 and a moving body detection signal transmission device at a relatively large distance, and to avoid self interference.

Figure 14:
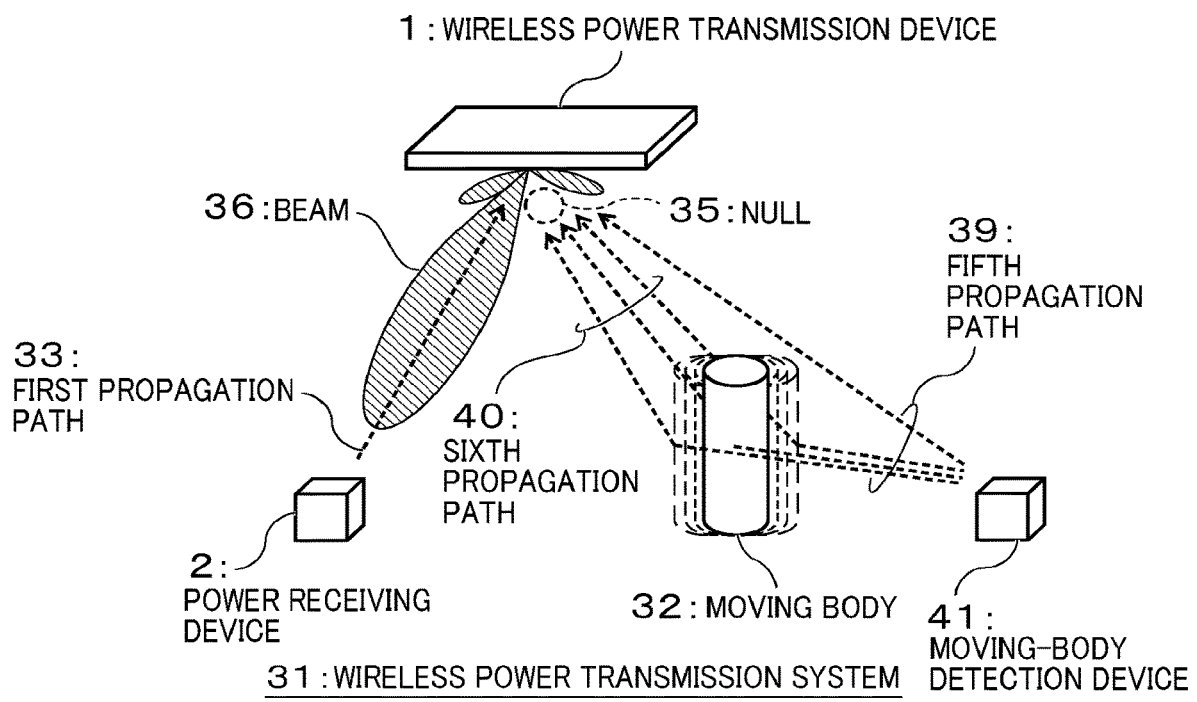
FIG. 14 is a view schematically showing a signal flow of the wireless power transmission system according to the fourth embodiment.

FIG. 14 is a view schematically showing a signal flow of a wireless power transmission system 31 according to the fourth embodiment. A control flow is the same as the control flow of the first to third embodiments, except that "the moving-body detection device 41 transmits the propagation path estimation signal via a fifth propagation path 39". For example, when the propagation path estimation signal is first transmitted via the fourth antenna 42 of the moving-body detection device 41, a first antenna 3 in the wireless power transmission device 1 receives the propagation path estimation signal scattered in a propagation environment. On the basis of the received propagation path estimation signal, a propagation path estimation unit 7 estimates fifth propagation path information characterizing the fifth propagation path 39 between a plurality of first antennas 3 and the fourth antenna 42. A propagation path extraction unit 8 extracts sixth propagation path information characterizing a sixth propagation path 40 passing through the moving body 32. On the basis of the fifth propagation path information and the sixth propagation path information, a weight calculator 9 obtains a pre-weight matrix for forming a null 35 for the moving body 32, and calculates a post-weight vector for forming a power transmission beam 36 for the power receiving device 2, from the pre-weight matrix and the first propagation path between the wireless power transmission device 1 and the power receiving device 2, the path being given by Expression (19). Then, by multiplying the pre-weight matrix and the post-weight vector, the null 35 is formed for the moving body 32, and the weight vector for forming the power transmission beam 36 for the power receiving device 2 is generated.

As described above, in the fourth embodiment, since the moving-body detection device 41 to transmit the propagation path estimation signal is provided separately from the wireless power transmission device 1 and the power receiving device 2, it is possible to simplify the configuration of the power receiving device 2, and to eliminate self interference that becomes a problem in transmitting the propagation path estimation signal from the wireless power transmission device 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless power transmission device comprising
a power transmitter to transmit a wireless power signal through a plurality of first antennas;
a propagation path estimation unit to estimate first propagation path information characterizing a propagation path between the plurality of first antennas and a predetermined antenna, based on a propagation path estimation signal having a same frequency as a frequency of the wireless power signal and being transmitted from the predetermined antenna;
a propagation path extraction unit to extract second propagation path information characterizing a propagation path passing through a moving body, based on at least one of a difference on a time axis of a plurality of pieces of the first propagation path information each acquired at different times, and filtering on a frequency axis;
a weight calculator to calculate a weight vector that determines a directivity of a combined power transmission beam formed by the plurality of first antennas, based on at least one of the first propagation path information and the second propagation path information; and
a controller to control an amplitude and a phase of the wireless power signal inputted to each of the plurality of first antennas, based on the weight vector.

2. The wireless power transmission device according to claim 1, wherein
the predetermined antenna is a second antenna of a power receiving device to receive the wireless power signal transmitted from the power transmitter; and
the propagation path estimation unit estimates first propagation path information characterizing a propagation path between the plurality of first antennas and the second antenna, based on the propagation path estimation signal transmitted from the power receiving device through the second antenna.

3. The wireless power transmission device according to claim 1, wherein
the predetermined antenna is a third antenna provided in the power transmitter; and
the propagation path estimation unit estimates first propagation path information characterizing a propagation path between the plurality of first antennas and the third antenna, based on the propagation path estimation signal transmitted by the third antenna.

4. The wireless power transmission device according to claim 3, wherein
the third antenna is a part of a first antenna among the plurality of first antennas provided in the power transmitter; and
the power transmitter comprises a signal source to generate the wireless power signal and the propagation path estimation signal.

5. The wireless power transmission device according to claim 1, wherein
the predetermined antenna is a fourth antenna of a moving-body detection device provided separately from the wireless power transmission device and a power receiving device to receive the wireless power signal transmitted from the power transmitter; and
the propagation path estimation unit estimates first propagation path information characterizing a propagation path between the plurality of first antennas and the fourth antenna, based on the propagation path estimation signal transmitted by the fourth antenna.

6. The wireless power transmission device according to claim 2, wherein
the weight calculator calculates the weight vector so that a power transmission beam at a position of the moving body becomes a null and transmission of wireless power to the power receiving device is performed.

7. A wireless power transmission system comprising:
a power transmission device to transmit a wireless power signal through a plurality of first antennas; and
a power receiving device to receive the wireless power signal through a second antenna, the wireless power transmission system comprising:
a propagation path estimation unit to estimate first propagation path information characterizing a propagation path between the plurality of first antennas and a predetermined antenna, based on a propagation path estimation signal having a same frequency as a frequency of the wireless power signal and being transmitted from the predetermined antenna;
a propagation path extraction unit to extract second propagation path information characterizing a propagation path passing through a moving body, based on at least one of a difference on a time axis of a plurality of pieces of the first propagation path information each acquired at different times, and filtering on a frequency axis;
a weight calculator to calculate a weight vector that determines a directivity of a combined power transmission beam formed by the plurality of first antennas, based on at least one of the first propagation path information and the second propagation path information; and
a controller to control an amplitude and a phase of the wireless power signal inputted to each of the plurality of first antennas, based on the weight vector.

8. The wireless power transmission system according to claim 7, wherein
the predetermined antenna is a second antenna of a power receiving device to receive the wireless power signal transmitted from the power transmitter; and
the propagation path estimation unit estimates first propagation path information characterizing a propagation path between the plurality of first antennas and the second antenna, based on the propagation path estimation signal transmitted from the power receiving device through the second antenna.

9. The wireless power transmission system according to claim 7, wherein
the predetermined antenna is a third antenna provided in the power transmitter; and
the propagation path estimation unit estimates first propagation path information characterizing a propagation path between the plurality of first antennas and the third antenna, based on the propagation path estimation signal transmitted by the third antenna.

10. The wireless power transmission system according to claim 9, wherein
the third antenna is a part of a first antenna among the plurality of first antennas provided in the power transmitter; and
the power transmitter comprises a signal source to generate the wireless power signal and the propagation path estimation signal.

11. The wireless power transmission system according to claim 7, wherein the predetermined antenna is a fourth antenna of a moving-body detection device provided separately from the wireless power transmission device and a power receiving device to receive the wireless power signal transmitted from the power transmitter; and the propagation path estimation unit estimates first propagation path information characterizing a propagation path between the plurality of first antennas and the fourth antenna, based on the propagation path estimation signal transmitted by the fourth antenna.

12. The wireless power transmission system according to claim 8, wherein the weight calculator calculates the weight vector so that a power transmission beam at a position of the moving body becomes a null and transmission of wireless power to the power receiving device is performed.

13. A wireless power transmission method for performing wireless power transmission between a power transmission device to transmit a wireless power signal through a plurality of first antennas, and a power receiving device to receive the wireless power signal through a second antenna, the wireless power transmission method comprising:

estimating first propagation path information characterizing a propagation path between the plurality of first antennas and a predetermined antenna, based on a propagation path estimation signal having a same frequency as that of the wireless power signal and being transmitted from the predetermined antenna;

extracting second propagation path information characterizing a propagation path passing through a moving body, based on at least one of a difference on a time axis of a plurality of pieces of the first propagation path information each acquired at different times, and filtering on a frequency axis; and calculating a weight vector that determines a directivity of a combined power transmission beam formed by the plurality of first antennas, based on at least one of the first propagation path information and the second propagation path information, and controlling an amplitude and a phase of the wireless power signal inputted to each of the plurality of first antennas, based on the weight vector.

14. The wireless power transmission method according to claim 13, wherein the predetermined antenna is a second antenna of a power receiving device to receive the wireless power signal transmitted from the power transmitter; and the estimating of the first propagation path information estimates first propagation path information characterizing a propagation path between the plurality of first antennas and the second antenna, based on the propagation path estimation signal transmitted from the power receiving device through the second antenna.

15. The wireless power transmission method according to claim 13, wherein the predetermined antenna is a third antenna provided in the power transmitter; and the estimating of the first propagation path information estimates first propagation path information characterizing a propagation path between the plurality of first antennas and the third antenna, based on the propagation path estimation signal transmitted by the third antenna.

16. The wireless power transmission method according to claim 15, wherein the third antenna is a part of a first antenna among the plurality of first antennas provided in the power transmitter, the power transmitter further comprises:

generating the wireless power signal and the propagation path estimation signal.

17. The wireless power transmission method according to claim 13, wherein the predetermined antenna is a fourth antenna of a moving-body detection device provided separately from the wireless power transmission device and a power receiving device to receive the wireless power signal transmitted from the power transmitter; and the estimating of the first propagation path information estimates first propagation path information characterizing a propagation path between the plurality of first antennas and the fourth antenna, based on the propagation path estimation signal transmitted by the fourth antenna.

18. The wireless power transmission method according to claim 14, wherein the calculating of the weight vector calculates the weight vector so that a power transmission beam at a position of the moving body becomes a null and transmission of wireless power to the power receiving device is performed.

* * * * *